United States Patent [19]

Krautstrunk et al.

[11] Patent Number: 5,466,776
[45] Date of Patent: Nov. 14, 1995

[54] PROCESS FOR THE MULTISTAGE GENERATION OF VACUUM FOR POLYESTER PRODUCTION

[75] Inventors: Juergen Krautstrunk; Klaus Mackensen, both of Frankfurt am Main, Germany

[73] Assignee: Zimmer Aktiengesellschaft, Frankfurt, Germany

[21] Appl. No.: 386,113

[22] Filed: Feb. 9, 1995

[30] Foreign Application Priority Data

Jun. 3, 1994 [DE] Germany ................ 44 19 397.1

[51] Int. Cl.⁶ .............. C08F 2/00; C08G 85/00; C08G 63/00
[52] U.S. Cl. .............. 526/68; 526/67; 528/308.3; 528/308.4; 528/308.7
[58] Field of Search ............... 526/67, 68; 528/308.3, 528/308.4, 308.7

[56] References Cited

U.S. PATENT DOCUMENTS 3,468,849  9/1969  Rothert ........................... 528/308.3
4,011,202  3/1977  Ebner et al. ...................... 528/483

*Primary Examiner*—Morton Foelak
*Attorney, Agent, or Firm*—Banner & Allegretti, Ltd.

[57] ABSTRACT

Process for multi-stage generation of a vacuum and condensation and recycling of the vapors of polycondensation in the production of polyester, where the last stage includes a liquid ring pump compressing to atmospheric pressure, a cooler and a degasifier tank. The process also includes at least two preceding stages each using a glycol vapor jet that is operated with superheated glycol vapor at a pressure in the range of 0.8 to 1.0 bar abs. and a downstream glycol spray condenser whose operating conditions are regulated to condense a maximum quantity of glycol and at the same time causing the low-boiling reaction by-products including water to remain in the gas phase.

13 Claims, 1 Drawing Sheet

PROCESS FOR THE MULTISTAGE GENERATION OF VACUUM FOR POLYESTER PRODUCTION

BACKGROUND OF THE INVENTION

The present invention concerns a process for multi-stage generation of vacuum and condensation and recycling of the vapors withdrawn from the polycondensation of precondensates in the production of polyesters. The vapors contain at least one $C_2$ to $C_4$ alkyl glycol and reaction by-products of the polycondensation process. The last stage of the vacuum generation process compressing to atmospheric pressure, consists of a liquid ring pump, a cooler, and a degasifier tank. Each of the at least two preceding stages includes a glycol vapor jet and a downstream glycol spray condenser.

Polyesters are produced by reacting at least one dicarboxylic acid such as terephthalic acid or naphthalene dicarboxylic acid or the methyl esters thereof with at least one alkyl glycol such as ethylene glycol or 1,4-butanediol, to which optionally small amounts of a cyclical or aromatic diol such as 1,4-cyclohexanedimethanol may be added. The compounds are reacted by esterification or ester exchange and then precondensed in a moderate vacuum, splitting off water and a small amount of glycol. Finally polycondensation is performed at a high vacuum, splitting off glycol and a small amount of water.

THE PRIOR ART

It is known that in order to generate the vacuum and remove the polycondensation vapors by suction, a water vacuum jet (jet pump) may be installed downstream from one or two glycol vapor vacuum jets, each of which in turn has a downstream spray condenser (U.S. Pat. No. 3,468,849 and German Patent (OLS) 2,227,261). Ethylene glycol vapor with a pressure of about 2 bar abs. is used as the operating medium for the glycol vapor jet pumps, starting either from fresh glycol or previously purified glycol. A disadvantage of these processes is that trouble-free operation over long periods of time is possible only with pure glycol. If glycol is recirculated without purifying it, the reaction by-products entrained by the vapors will accumulate, resulting in blockage of the jet nozzles due to deposition of oligomers and in a complete collapse of the suction power due to by-products having a high vapor pressure, such as water and acetaldehyde or tetrahydrofuran. The glycol vapor is also under an excess pressure, which even by a minor untightness, leads to leakages and to fires because of the high flammability of glycol.

A more recent proposal (U.S. Pat. No. 4,011,202) uses two glycol vapor jets for the same job, each with a downstream surface condenser and a cyclone, and a rotary pump in a closed glycol circuit with a cooler and a degasifier tank. Ethylene glycol and all the reaction by-products are condensed on the surface condensers as much as possible. To prevent an accumulation of by-products, part of the condensate is removed from the process and the remainder is used for generating the operating vapor after filtering out the oligomers. The pressure stages specified in this patent suggest that glycol vapor under excess pressure is also used here, which results in an increased risk of fire. In addition, filtering out oligomers requires very frequent changing of filters because the oligomers clog the filters within a very short period of time. The required removal of part of the condensate also increases the cost of the process.

The process according to East German Patent 131,753 avoids the problematical filtration of oligomers by partial condensation of the combined vapors from precondensation and polycondensation upstream from an unspecified vacuum system in a spray condenser at 100 to 140° C. The oligomer-rich partial condensate is recycled back to polyester synthesis. After total condensation in a spray condenser, the remaining vapors, which constitute more than 90% of the total vapors, together with the spray glycol needed for total condensation, must be purified by distillation before further use.

SUMMARY OF THE INVENTION

The object of the present invention is to modify the process described initially for vacuum generation and condensation and recycling of the exhausted vapors from polycondensation of polyester in such a way that the glycol needed to operate the glycol vapor jets and the spray condensers can be recycled for a longer period of operation without requiring filtration and/or distillative purification. The excess glycol, including the condensed reaction by-products, should be recycled back to the polyester synthesis process, preferably without partial discharge and without an additional purification stage. The danger of fire should also be minimized.

This object is achieved according to this invention by a process characterized by

- the use of superheated glycol vapor with a pressure in the range of 0.8 to 1.0 bar abs. as the operating medium for the glycol vapor jets and
- the adjustment of the operating conditions of the spray condensers such that the condensation of glycol is maximized while, at the same time, maximizing the quantity of the low-boiling reaction by-products, including water, which remain in the gas phase, and are condensed only in the last stage of the process.

The present process is suitable for generating a vacuum for polycondensation of homo- or copolyester precondensates under the condition that the diol component that forms the polyester consists mainly of ethylene glycol, 1,3-propanediol and/or 1,4-butanediol. The preferred application is for synthesis of polyethylene terephthalate and copolymers thereof with a low degree of modification (up to about 20 mol % of comonomers). Optionally, the vacuum for the precondensation that precedes the polycondensation may be generated at the same time. This precondensation can be carried out in a single reactor or in several reactors, preferably in two reactors of different vacuum. The suction lines for the precondensation reactor(s) are connected to intermediate stages that correspond to the desired vacuum.

The vacuum is generated in several stages, where the last stage, which compresses to atmospheric pressure, includes a liquid ring pump in a closed glycol circuit with a cooler and a degasifier tank. Each of the preceding at least two stages and preferably three stages, depending on the vacuum to be generated, consist of a glycol vapor jet with a downstream glycol spray condenser, also known as an injection condenser.

Each of these glycol vapor jets has a compression ratio in the range of 7 to 10 and is operated with glycol vapor at a pressure in the range of 0.8 to 1.0 bar abs., preferably 0.9 to 0.98 bar. Because the glycol vapor has a pressure of at most atmospheric pressure, or preferably a slightly reduced pressure, the escape of highly inflammatory glycol through leakage in the vapor system is prevented. This greatly reduces the risk of fire. In order to prevent the operating medium from condensing inside the jet nozzles, the glycol vapor is superheated, preferably by 5° to 25° C.

All the spray condensers are operated under conditions to maximize condensation of the glycol phase including the high-boiling components, especially the oligomers, while at the same time a maximum of the low-boiling reaction by-products—predominantly water plus glycol decomposition products such as acetaldehyde in the case of ethylene glycol or tetrahydrofuran in the case of 1,4-butanediol— remain in the gas phase together with the uncondensable components, especially the leakage air. The operating conditions required for this are determined by the individual partial vapor pressures which in turn depend on the chemical nature of the components, the quantity ratios, the temperature and total pressure and must be determined individually for each given application by methods with which those skilled in the art are familiar. This type of operation results in a purification of the glycol with the effect of removing the low-boiling impurities, so it is possible to recycle the glycol condensate as spray glycol for the spray condensers without any additional measures. For economic and environmental reasons, a minimum of glycol is entrained with the lower boiling components which must be discharged from the vacuum generating system.

A portion of the glycol condensate is recycled as operating medium back to the glycol vapor jets after this fraction is freed of the high-boiling impurities by evaporation. The high boiling components are then discharged from the evaporator as the bottom phase. The low pressure of the operating medium of 0.8 to 1.0 bar abs. permits the vapor jet steam generator to be operated at a relatively low pressure in the range of 0.9 to 1.2 bar. Evaporation of glycol for the operating medium is possible at a relatively low temperature, with the result that the bottom phase in the evaporator is only exposed to a low thermal load. Therefore, the bottom phase can be recycled back to the polyester production process without further purification in most cases. Only in special cases such as the production of polyesters for highly transparent bottles, may an additional distillative work-up be advisable before recycling.

The condensable components of the gas phase from the spray condensers are condensed in the last stage of the process and recycled back to the polyester production process together with excess glycol condensate from the spray condensers that is fed into the closed glycol circuit of this last stage. Normally the glycol can be recycled directly, i.e., without additional measures.

Only in individual cases, for example, butanediol with a higher tetrahydrofuran content, is an additional distillative purification necessary. The uncondensable components are removed from the process and sent for incineration of the exhaust gases, for example. Preferably cooling water of a conventional temperature of about 25° to 30° C. is used for this last vacuum generator stage. Accordingly, the intake pressure of the liquid ring pump should be in the range of 80 to 110 mbar abs. If there is a large fraction of low-boiling components to be condensed out such as water, acetaldehyde or tetrahydrofuran, the vapor pressure of the operating medium in the ring pump may also be regulated by adjusting the amount of excess glycol condensate fed into the circuit in addition to the adjustment of temperature. Optionally this amount may have to be supplemented by adding glycol.

BRIEF DESCRIPTION OF THE DRAWING

There is shown in the drawing a presently preferred embodiment of the invention, wherein.

DETAILED DESCRIPTION

Figure 1:
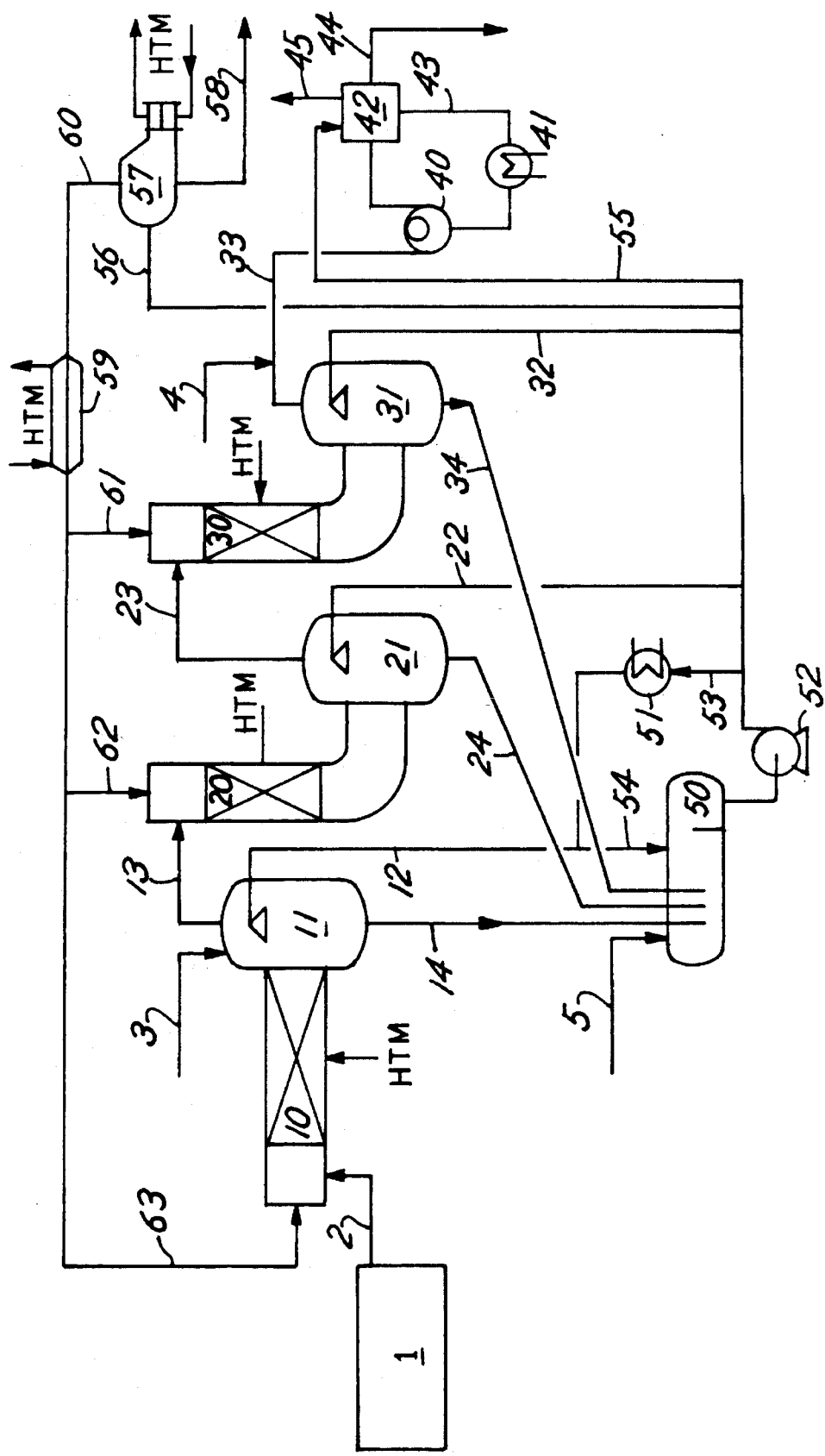
FIG. 1 is a schematic flow chart illustrating the process of the present invention.

The preferred embodiment of the process according to this invention is described in detail below with reference to the schematic flow chart shown in the single figure of the accompanying drawing.

The polycondensation reactor with or without a downstream process condenser system (receiver 1) is evacuated by means of a combination of glycol vapor jets or aspirators and a liquid ring pump. The intake conduit 2 connects the first jet stage 10 to receiver 1. The mixture to be removed by suction from the receiver I corresponds in composition and quantity to the reaction by-products and decomposition products obtained in the respective polycondensation process for homopolyester or copolyester. For example, in the case of polyethylene terephthalate, this will be mainly ethylene glycol plus water, acetaldehyde, diethylene glycol, triethylene glycol, oligomers and low molecular polyethylene terephthalate. In addition, leakage air is also present as inert gas in the intake stream in an amount that depends on the leakage of receiver 1. The jet 10 and its jet nozzle are heated with HTM (heat transfer medium, synthetic heating oil). The operating medium for the jet 10 which is supplied through line 63 is taken from the glycol evaporator system 57, 59 described below.

In the first spray condenser 11, the vapor mixture leaving the jet 10 is partially condensed by means of tempered liquid glycol 12 from the first injection partial circuit 50-53 and 12 that is described in detail below. In addition to the mixture discharged from the first glycol vapor jet 10, the uncondensed but condensable fractions and the leakage air of the condensation system of the second of two precondensation reactors (not shown) of the polyester production process are fed into spray condenser 11 through line 3. At the same time the downstream vapor jet 20 generates the vacuum required for this second precondensation reactor without the need of any additional vacuum pump. The composition of vapors in line 3 corresponds essentially to that of the vapor mixture in line 2, but the amount of water is greater. The operating parameters of this spray condensation are essentially for the self-purification of the system by keeping the low boilers in the vapor phase and removing them from the circuit of the liquid spray glycol by the downstream vacuum pump, whereas the high boilers remain in the spray glycol from part of which they are automatically separated simultaneously to the generation of the operating vapors for the glycol vapor jets. Through appropriate regulation of temperature in the first injection partial cycle 50–53, 12 by means of the heat exchanger 51, and in accordance with the vacuum in the spray condenser unit 11 which is determined by the compression ratio of the glycol vapor jet 10, the partial condensation of vapors is regulated thus, that a maximum of the low boilers (water, acetaldehyde or tetrahydrofuran, etc.) and the air remain in the gas phase while a maximum quantity of glycol is condensed along with the high boilers, mainly oligomers. The condensed fractions are sent together with the injection glycol 12 through immersion pipe 14 into a circuit collecting tank 50.

The intake line 13 of the second jet 20 is connected to spray condenser 11. The mixture to be removed by suction from spray condenser 11 corresponds in composition to the uncondensed but condensable components resulting from partial condensation in spray condenser 11 plus a certain amount of leakage air as inert gas, the quantity of which depends on the leakage in the system. The jet 20 and its jet nozzle are also heated with HTM. The operating medium of jet 20 which is supplied through line 62 is taken from the glycol evaporator system 57, 59.

In a second spray condenser 21 the glycol vapor mixture leaving jet 20 is partially condensed by means of liquid glycol 22 from the second injection partial circuit 50, 52, 22 which has a somewhat higher temperature than the glycol 12 of the first injection partial circuit 50–53, 12. This second condensation 21 is also essential in the self-purification of the system from both low and high boilers and for minimizing the burden on the next stage. Through appropriate adjustment of the flow rate at a given temperature in the second injection partial circuit 50, 52, 22, the partial vapor condensation is adjusted in accordance with the vacuum in the spray condenser 21 which is determined by the compression ratio of the glycol vapor jet 20, so that with air as an inert gas, a maximum of the low boilers (water, acetaldehyde or tetrahydrofuran, etc.) remain in the gas phase while the glycol together with the remaining high boilers (dimers, oligomers, etc.) is condensed to the greatest extent. By adjusting the temperature in the spray condenser 21, approximately the same absolute amount of uncondensed but condensable components is maintained in the exiting gas phase in line 23 as that sent through the intake connection 13 to the second glycol vapor jet 20. This assures that the liquid phase leaving the spray condenser 21 through line 24 will have approximately the same composition as that leaving the first spray condenser 11. Therefore, the two condensates from lines 14 and 24 can be mixed. The condensed fractions, together with the injected glycol from line 22 flow through immersion pipe 24 into the circuit collecting tank 50.

The intake connection 23 to the third jet 30 leads from spray condenser 21. The mixture to be removed by suction from spray condenser 21 corresponds in composition to the uncondensed but condensable components resulting from partial condensation in the second spray condenser 21 plus a certain amount of leakage air as inert gas, the quantity of which depends on the leakage in the system. The vapor jet 30 and its jet nozzle are heated with HTM. The operating medium for jet 30 received through line 61 is also taken from the glycol evaporator system 57, 59.

The glycol vapor mixture leaving the jet 30 is partially condensed in spray condenser 31 by means of liquid spray glycol from line 32 from the third injection partial cycle 50, 52, 32. This glycol mixture has approximately the same temperature as the glycol flowing from line 22 from the second injection partial cycle 50, 52, 22. Spray condenser 31 is also essential for the self-cleaning effect of the system from low boilers and high boilers and in minimizing the load on the downstream liquid ring pump 40. Through appropriate flow regulation at a given temperature in the third injection partial cycle 50, 52, 32 the partial vapor condensation is again adjusted in accordance with the vacuum in the condenser 31, which is determined by the compression ratio of the glycol vapor jet 30, so that a maximum of the low boilers (water, acetaldehyde or tetrahydrofuran, etc.) remain in the gas phase together with air as an inert gas, while a maximum quantity of the glycol is condensed together with the remaining high boilers (dimers, oligomers, etc.). By adjusting the temperature in the spray condenser 31, approximately the same absolute amount of uncondensed but condensable components is kept in the gas phase as is present in the mixture supplied through the intake connection 23 to the third glycol vapor jet 30. This assures that the liquid phase leaving spray condenser 31 through line 34 will have approximately the same composition as the liquid phases in lines 14 and 24 from the first and second spray condensers 11 and 21. These liquid phases can therefore be combined. The condensed fractions, together with the injected glycol 32 flow through immersion pipe 34 into the circuit collecting tank 50.

The operating conditions for the spray condensers 11, 21, 31 depend primarily on the composition and quantity of the vapors 2, 3 and 4, which depend on the polyester type to be produced. The glycol content of the non-condensed phases 13, 23 and 33 and the water content of the condensed phases 14, 24 and 34 can be analyzed without problem, and the operating conditions, in particular the quantity and the temperature of the spray liquid 12, 22 and 32 adjusted until simultaneously the glycol content of the non-condensed phases and the water content of the condensed phases reach a minimum. This corresponds to a maximum of glycol in the condensed phases 14, 24 and 34 and a maximum of water in the non-condensed phases 13, 23 and 33.

The intake line 33 to the liquid ring pump 40 is connected to spray condenser 31 of the third stage. The mixture to be removed by suction from spray condenser 31 corresponds in composition to the uncondensed but condensable components resulting from partial condensation in spray condenser 31 plus a certain amount of leakage air as inert gas. In addition to the vapors from the third spray condenser 31, the uncondensed but condensable components and the leakage air of the condensation system of the first of two precondensation reactors (not shown) of the polyester production process are sent through line 4 into intake line 33. In this way the vacuum required for this first precondensation reactor is generated at the same time as the vacuum in spray condenser 31 without the need for an additional vacuum pump. The composition of these vapors in line 4 corresponds essentially to that of mixture in line 2 specified above but the water content is higher. The liquid ring pump system consists of the liquid ring pump 40, a degasifier tank 42, and a cooler 41. The operating fluid (glycol) as well as the uncondensed but condensable components from the preceding stages and the leakage air as inert gas are separated in this system according to vapor saturation. The operating fluid of the liquid ring pump 40 is the excess fluid of the glycol circuit which consists of the vapors of polycondensation in line 2 and of the condensation system of the second precondensation stage in line 3 plus a certain amount of glycol 5 (recovered or fresh glycol) minus the amount of bottom discharge 58 from the glycol evaporator 57. This operating fluid has an increased low-boiler concentration and a reduced high-boiler concentration due to the self-cleaning effect of the entire glycol circuit system with respect to the polycondensation vapors in line 2.

The liquid ring pump 40 is the last vacuum unit in the vacuum generating system and compresses to a pressure of 1 bar absolute on the pressure side of the pump. The intake pressure of the liquid ring pump 40 is determined by the compression ratios of the upstream glycol vapor jets 10, 20, 30. For economical operation of the liquid ring pump 40, the vapor pressure of the operating fluid of the liquid ring pump 40 should be adjusted according to its intake pressure. This adjustment can take place on the basis of either the temperature or the composition of the mixture. Cooler 41 is operated with ordinary cooling water at a temperature of about 25° to 30° C. In order to be able to operate the liquid ring pump 40 in the optimum range at this temperature and with proportional quantity ratios that are determined by the process, the intake pressure of the liquid ring pump 40 must be in the range of 80 to 110 mbar abs. In addition, by varying the amount of glycol added to tank 50 through line 5 and thus the amount of excess fluid supplied through line 55, the proportional composition of the operating fluid and the proportional vapor pressure can be influenced. The exhaust gas from the liquid ring pump system, which is a very small amount compared to the total vapors processed, is discharged through line 45 and, for example, is sent for incineration. Incineration converts the unavoidable gaseous pollution emissions consisting of air contaminated with small amounts of organic compounds to harmless emissions. The liquid overflow of the operating fluid of the liquid ring pump 40 through line 44 can in most cases be reused directly without any further treatment in the polyester process. In individual case, such as the case of butanediol with a high tetrahydrofuran content, an additional distillative purification may be expedient.

The glycol circulating system consists of the circuit collecting tank 50, the pump 52 and the cooler 51. In the circuit collecting tank 50, the mixture of glycol condensate and injected glycol leaving the three spray condensers 11, 21 and 31 through the immersion pipes 14, 24 and 34 is collected. The spray condensers 11, 21 and 31 being under vacuum and the collecting tank 50 under atmospheric pressure, the immersion pipes 14, 24 and 34, which release the liquid glycol to the collecting tank 50, are dipped into the liquid in the collecting tank 50 and their height is determined by the barometric pressure difference. Thus, the entrance of air and backflowing of liquid into the spray condensers is avoided. A mixed temperature prevails in the circuit collecting tank 50 due to the rising temperatures of the glycols supplied through lines 14, 24 and 34. This mixed temperature can be influenced by means of a side stream 54 that is taken from the first injection partial circuit 50–53 and 12 which includes the cooler 51. Preferably the side stream 54 is adjusted in such a way that the temperature of the glycol in the circuit collecting tank 50 and in the second and third injection partial circuits 22 and 32 is 5° to 30° higher, preferably 10° to 20° higher, than the temperature of the glycol 12 supplied to the first spray condenser 11. The composition of the glycol in the circuit is based on the amount of vapor of polycondensation from line 2 and of the condensation system of the second precondensation from line 3 plus a minimal amount of glycol that is supplied from line 5 to the circuit collecting tank 50 continuously and in a regulated manner minus the amount of low boilers from line 33 that remain in the gas phase of the spray condensers and minus the amount 58 discharged from the glycol evaporator 57. The glycol added through line 5 may be either fresh or recovered glycol, but preferably recycled glycol only freed of high boilers is used for this purpose. The amount depends on the vapor pressure of the operating fluid to be established in the liquid ring pump 40.

With the help of the pressure boosting circuit pump 52 and conventional control technology, the glycol of the first circuit is divided into three partial circuits 50–53 and 12, 22 and 32 and two discharge streams 55, 56. The full amount of the first injection partial circuit 50–53 and 12 is cooled in the circuit cooler 51 and serves as the injection cooling liquid for condensation in the first spray condenser 11. Substream 54 is used to regulate the temperature of the glycol in the circuit collecting tank 50. The amount of injection cooling liquid from line 12 is determined by the temperature in the spray condenser 11. The second injection partial circuit 50, 52 and 22 is the tempered stream which is sent, without any further cooling, as the injection cooling fluid from line 22 to the second spray condenser 21 for condensation. The amount of injection cooling fluid 22 is determined by the temperature in the spray condenser 21. The third injection partial circuit 50, 52 and 32 is also a tempered stream that is sent without further cooling as the injection cooling liquid 32 to the third spray condenser 31 for condensation. The amount of injection cooling fluid 32 is in turn determined by the temperature in the spray condenser 31.

The first discharge stream 55 from the glycol circuit carries glycol to the liquid ring pump system 40-43. The amount is the excess of the glycol circuit. The second discharge stream 56 carries glycol in circulation to the glycol evaporator 57. This amount is equal to the amount of operating medium 61, 62 and 63 as the sum of the three jet pump stages 10, 20, 30 plus the amount of regulating vapor (not shown) needed to adjust the vacuum and plus the amount discharged through line 58 from the glycol evaporator 57.

The glycol evaporator 57 that is heated with HTM is used to generate the operating and the regulating vapor 61, 62, 63 for the glycol vapor jet pumps 10, 20, 30. The operating medium is generated in the glycol evaporator 57 under a pressure in the range of 0.9 to 1.2 bar abs., preferably under a mild excess pressure, and flows through line 60 into the superheater 59 that is heated with HTM. The vapor is preferably superheated by 5° to 25° C. above its boiling temperature at the pressure of the evaporator. The pressure of the operating and regulating vapor in the lines 60 to 63 is in the range of 0.8 to 1.0 bar abs., preferably with a slightly reduced pressure in the range of 0.9 to 0.98 bar abs.

The glycol vaporizer 57 is supplied from the glycol circuit through line 56. The composition of the glycol corresponds to that of the circuit as described above. The composition of the operating and regulating vapor 61 to 63 for the glycol vapor jets 10, 20, 30 corresponds to the composition of the glycol of the circuit minus the amount of high boilers (oligomers, etc.) that accumulate in the bottom of the glycol vaporizer 57 due to the distillation effect taking place there. The amount of high boilers (oligomers, etc.) supplied to the glycol vaporizer 57, together with the circuit glycol, is removed continuously through line 58 from the bottom of the glycol vaporizer 57 as a mixture of glycol, dimers and trimers, oligomers, etc. This discharge flow is directly recyclable and is reused in the polyester production process without any further treatment. In the individual case—for example, in the case of polyethylene terephthalate for highly transparent bottles—distillative purification before recycling may be expedient. The accumulation of high boilers in the liquid bottom phase of the glycol vaporizer 57 which is removed from the glycol circuits through line 58 constitutes the important self-cleaning effect of the system according to this invention with regard to the high boilers.

We claim:

1. In a process for multi-stage vacuum generation and condensation and recycling of the vapors withdrawn from the polycondensation of polyester precondensates in a polyester process, said withdrawn vapors containing at least one $C_2$ to $C_4$ alkyl glycol, higher boiling reaction by-products and lower boiling reaction by-products, including water, which process comprises a last stage compressing to atmospheric pressure consisting of a liquid ring pump, a cooler and a degasifier tank, and at least two preceding stages consisting each of a glycol vapor jet and a downstream glycol spray condenser, the improvement comprising operating said glycol vapor jets with superheated glycol vapor having a pressure in the range of 0.8 to 1.0 bar absolute, condensing a maximum of said alkyl glycol and of said higher boiling by-products in said glycol spray condensers, while a maximum of said lower boiling by-products, including water, remains in the gas phase, condensing said lower boiling by-products in said last stage, and recycling the condensates from the spray condensers within said process.

2. Process according to claim 1, characterized in that the condensates from said glycol spray condensers are combined and reused as spray glycol for said condensers and for generating the glycol vapor for said vapor jets, the excess condensate being sent to said degasifier tank.

3. Process according to claim 2, characterized in that glycol is added to the combined condensates.

4. Process according to claim 1, characterized in that the condensate of said last stage is recycled back to said polyester process and gas phase non-condensed in said last stage is removed from the process.

5. Process according to claim 4, characterized in that the condensate of said last stage is purified by distillation before being recycled back to the polyester process.

6. Process of claim I which includes collecting the condensates from said spray condensers, recycling a part of said collected condensates as spray fluid to said spray condensers, evaporating glycol from another part of said collected condensates and recycling said evaporated glycol to operate said glycol vapor jets, and feeding the remaining part of said collected condensates into said last stage.

7. Process according to claim 6, in which said other part of said collected condensates is evaporated at a pressure in the range of 0.9 to 1.2 bar abs., said recycled evaporated glycol is superheated by 5°–25° C. and supplied to said jets as the operating medium at a pressure of 0.8 to 1.0 bar abs.

8. Process of claim 7 in which the liquid phase remaining after evaporating glycol from said collected condensates is recycled back to the polyester process without any further purification.

9. Process of claim 7 in which the liquid phase remaining after evaporating glycol from said collected condensates is purified by distillation before being recycled back to the polyester process.

10. Process according to claim 1, in which a total of three glycol vapor jets are provided, each having a compression ratio in the range of 7 to 10 and the intake pressure of said liquid ring pump is in the range of 80 to 110 mbar abs.

11. Process of claim 1 in which said polyester precondensates are obtained by precondensation under vacuum, said vacuum being generated simultaneously to the vacuum of the polycondensation.

12. Process of claim 11 in which said precondensation comprises two reactors, the vacuum of one of these reactors being drawn by said last stage and the vacuum of the other reactor by an intermediate stage of said preceding stages.

13. Process according to claim 1, in which the glycol is ethylene glycol.

* * * * *